(12) United States Patent
Yu et al.

(10) Patent No.: US 11,251,468 B2
(45) Date of Patent: Feb. 15, 2022

(54) DEVICE FOR BATTERY FORMATION

(71) Applicants: JIANGSU CONTEMPORARY AMPEREX TECHNOLOGY LIMITED, Liyang (CN); CONTEMPORARY AMPEREX TECHNOLOGY CO., LIMITED, Ningde (CN)

(72) Inventors: Wen Yu, Liyang (CN); Hua Zhang, Liyang (CN); Jian Chen, Liyang (CN); Jing Yang, Liyang (CN); Lin Chen, Liyang (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 86 days.

(21) Appl. No.: 16/548,597

(22) Filed: Aug. 22, 2019

(65) Prior Publication Data
US 2020/0411899 A1   Dec. 31, 2020

Related U.S. Application Data

(63) Continuation of application No. PCT/CN2019/095241, filed on Jul. 9, 2019.

(30) Foreign Application Priority Data

Jun. 28, 2019   (CN) .......................... 201910574583.1

(51) Int. Cl.
*H01M 10/058*   (2010.01)
*H01M 10/44*   (2006.01)
(Continued)

(52) U.S. Cl.
CPC ..... *H01M 10/058* (2013.01); *H01M 10/0404* (2013.01); *H01M 10/0525* (2013.01);
(Continued)

(58) Field of Classification Search
CPC .. H01M 50/258; H01M 50/70; H01M 10/058; H01M 10/0404; H01M 10/44; H01M 10/0525
See application file for complete search history.

(56) References Cited

FOREIGN PATENT DOCUMENTS

| CN | 205846140 U | 12/2016 |
|---|---|---|
| CN | 206210942 U | 5/2017 |

(Continued)

OTHER PUBLICATIONS

Machine translation of CN 108808102 (no date).*
(Continued)

*Primary Examiner* — Amanda C. Walke
(74) *Attorney, Agent, or Firm* — Morgan, Lewis & Bockius LLP

(57) ABSTRACT

The present disclosure provides a device for battery formation, which comprises a negative pressure mechanism, a connecting assembly and a suction joint. The negative pressure mechanism has a receiving cavity inside. The suction joint is provided to the negative pressure mechanism and communicated with the receiving cavity. The connecting assembly is provided as plurality in number, and the plurality of the connecting assemblies are provided to the negative pressure mechanism; each connecting assembly is communicated with the receiving cavity and used for being connected to a battery.

11 Claims, 6 Drawing Sheets

(51) Int. Cl.
*H01M 10/04* (2006.01)
*H01M 10/0525* (2010.01)
*H01M 50/70* (2021.01)
*H01M 50/258* (2021.01)

(52) U.S. Cl.
CPC ......... *H01M 10/44* (2013.01); *H01M 50/258* (2021.01); *H01M 50/70* (2021.01)

(56) References Cited

FOREIGN PATENT DOCUMENTS

| CN | 206340598 U | 7/2017 | |
|---|---|---|---|
| CN | 206422143 U | 8/2017 | |
| CN | 206976522 U | 2/2018 | |
| CN | 207233883 U | 4/2018 | |
| CN | 108075201 A | 5/2018 | |
| CN | 108598579 A | 9/2018 | |
| CN | 108666624 A | 10/2018 | |
| CN | 108808102 A | 11/2018 | |
| CN | 209786130 U | 12/2019 | |
| CN | 210607502 U | * | 5/2020 |
| CN | 211265648 U | * | 8/2020 |
| DE | 202009009179 U1 | 9/2009 | |
| DE | 102017223231 A1 | 6/2019 | |

OTHER PUBLICATIONS

Machine translation of CN 207233883 (no date).*
Machine translation of CN 210607502 (no date).*
Machine translation of CN 211265648 (no date).*
Machine translation of CN 108075201 (no date).*
Machine translation of DE 202009009179 (no date).*
Machine translation of CN 205846140 (no date).*
Jiangsu Contemporary Amperex Technology Limited, International Search Report and Written Opinion, PCT/CN2019/095241, dated Mar. 12, 2020, 9 pgs.
Jiangsu Contemporary Amperex Technology Limited and Contemporary Amperex Technology Co., Limited , Extended European Search Report, EP19752908.4, dated Nov. 23, 2020, 8 pgs.

* cited by examiner

DEVICE FOR BATTERY FORMATION

CROSS REFERENCE TO RELATED APPLICATIONS

This application is a continuation application of PCT/CN2019/095241, filed on Jul. 9, 2019, which claims priority to Chinese Patent Application No. 201910574583.1, filed with the National Intellectual Property Administration of the People's Republic of China on Jun. 28, 2019, all of which are incorporated herein by reference in their entirety.

FIELD OF THE PRESENT DISCLOSURE

The present disclosure relates to the field of battery production, and particularly relates to a device for battery formation.

BACKGROUND OF THE PRESENT DISCLOSURE

In the production process of lithium-ion battery, the formation process plays a key role on the quality of the battery. In the formation process, a large amount of gases are generated in the battery, so it needs a corresponding device for formation to degas timely. In the degassing process, an electrolyte in the battery will be brought out; in the known device for formation, it generally provides a plurality of containers which are independent of each other and each store the electrolyte brought out. However, the containers independent of each other occupy a large space, and the model changing process is complex, which seriously influences the efficiency of the battery formation process.

SUMMARY OF THE PRESENT DISCLOSURE

In view of the problem existing in the background, an object of the present disclosure is to provide a device for battery formation, which has a good compatibility, can simplify the model changing process and improves the efficiency of the battery formation.

In order to achieve the above object, the present disclosure provides a device for battery formation, which comprises a negative pressure mechanism, a connecting assembly and a suction joint. The negative pressure mechanism has a receiving cavity inside. The suction joint is provided to the negative pressure mechanism and communicated with the receiving cavity. The connecting assembly is provided as plurality in number, and the plurality of the connecting assemblies are provided to the negative pressure mechanism; each connecting assembly is communicated with the receiving cavity and used for being connected to a battery.

The negative pressure mechanism comprises a negative pressure container and a covering plate, the receiving cavity is formed in the negative pressure container, the covering plate is connected with the negative pressure container and seals the receiving cavity. The suction joint is connected with the covering plate; the connecting assembly is connected with the negative pressure container.

The receiving cavity comprises a sub-cavity and a collecting cavity, the sub-cavity is provided as plurality in number, and the plurality of the sub-cavities are separated from each other; the collecting cavity is positioned at a side of the plurality of sub-cavities close to the covering plate, and the collecting cavity is communicated with the plurality of sub-cavities. The suction joint and the collecting cavity are communicated. Each connecting assembly is communicated with one corresponding sub-cavity.

The negative pressure mechanism further comprises a separating plate, the separating plate is received in the collecting cavity. Each sub-cavity has an opening communicated with the collecting cavity, and the separating plate only covers a part of the opening of each sub-cavity.

The negative pressure mechanism further comprises a limiting member, the limiting member is connected with the separating plate and provided between the separating plate and the covering plate.

The negative pressure container has a plurality of connecting portions protruding at an end away from the covering plate, and the number of the connecting portions is equal to the number of the sub-cavities. Each connecting portion is positioned at a side of one corresponding sub-cavity away from the covering plate and has a first through-hole communicated with the sub-cavity. The negative pressure mechanism further comprises a connection joint and a fastener, the connection joint has a flange, a first extending portion and a second extending portion, the first extending portion extends from a side of the flange close to the connecting portion, the second extending portion extends from a side of the flange away from the connecting portion. The fastener is received in the first through-hole and has a second through-hole, the second through-hole is communicated with the sub-cavity. The flange is inserted into the first through-hole, the first extending portion is inserted into the second through-hole and connected with the fastener by thread. The connection joint has a third through-hole passing through the first extending portion, the flange and the second extending portion, the third through-hole is communicated with the second through-hole.

The flange is provided with a notch along a periphery, the connecting portion has a protrusion extending from a wall of the first through-hole, the protrusion is inserted into the notch.

Each connecting assembly comprises a first connecting pipe and a nozzle, one end of the first connecting pipe is connected with the negative pressure mechanism, the other end of the first connecting pipe is connected with the nozzle.

The device for battery formation further comprises a base plate, a press plate and a positioning block. The positioning block is provided as plurality in number and the plurality of positioning blocks are positioned between the base plate and the press plate. The negative pressure mechanism is connected with the base plate, the press plate is positioned at a side of the base plate away from negative pressure mechanism and connected with the base plate. The first connecting pipe of each connecting assembly is connected with the positioning block.

The positioning block has a main portion and a protruding portion, the main portion is provided between the base plate and the press plate, the protruding portion extends from a surface of the main portion away from the press plate. The base plate is provided with a plurality of positioning holes, and the protruding portion of each positioning block is inserted into the positioning hole. The main portion is provided with a fourth through-hole, the first connecting pipe passes through the fourth through-hole and is connected with the main portion.

The nozzle sheathes one end of the first connecting pipe, an outer diameter of the other end of the first connecting pipe away from the nozzle is larger than a diameter of the fourth through-hole. The connecting assembly further comprises a spring, the spring sheathes the first connecting pipe and is positioned between the nozzle and the main portion.

The first connecting pipe is a metal pipe. The connecting assembly further comprises a second connecting pipe, the second connecting pipe connects the first connecting pipe and the negative pressure mechanism, and the second connecting pipe is a flexible pipe.

The nozzle is positioned at a side of the press plate away from the base plate. The press plate is provided with a fifth through-hole in the shape of strip, the base plate is provided with a sixth through-hole in the shape of strip, the fifth through-hole and the sixth through-hole are respectively positioned at two sides of the fourth through-hole. The first connecting pipes of the plurality of connecting assemblies pass through the fifth through-hole. The sixth through-hole exposes one end of the first connecting pipe away from the nozzle.

The present disclosure has the following beneficial effects: in the present disclosure, it integrates a plurality of connecting assemblies to one negative pressure mechanism, and stores the electrolytes of the batteries by using the receiving cavity of the negative pressure mechanism. Therefore, compared to the known technology, the negative pressure mechanism of the present disclosure occupies a smaller space, and the receiving cavity inside the negative pressure mechanism has a larger capacity, thereby improving the compatibility of the device for battery formation of the present disclosure. In addition, when the model of the batteries changes, it only needs to adjust the connecting assemblies, and there is no need to assemble or disassemble the negative pressure mechanism, thereby simplifying the model changing process, improving the efficiency of the battery formation.

Figure 1:
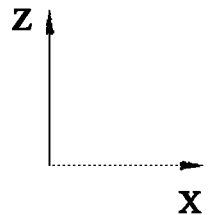
FIG. 1 is a schematic view of a device for battery formation according to the present disclosure.
Figure 1:
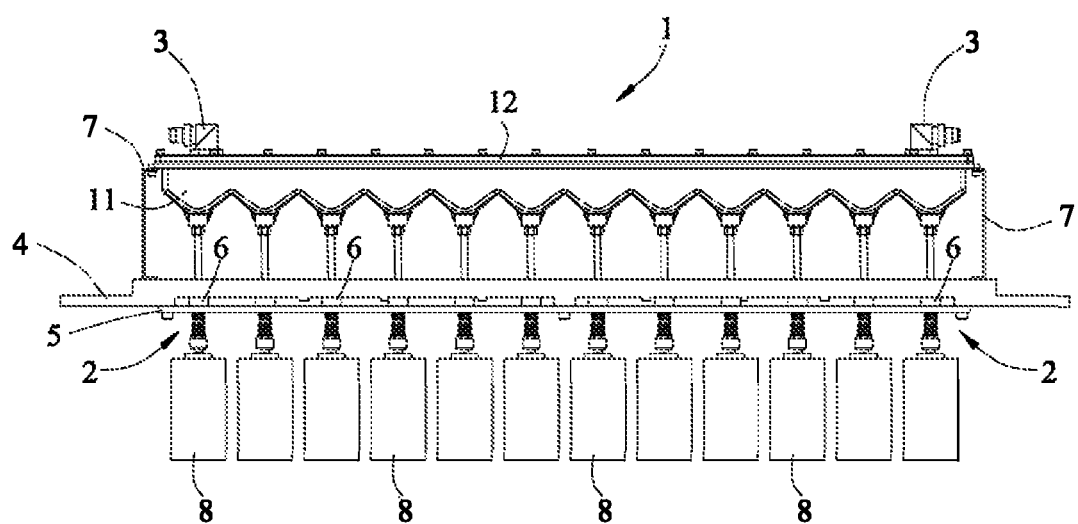

Reference numerals in figures are represented as follows:
1 negative pressure mechanism
11 negative pressure container
   111 connecting portion
      111a protrusion
  12 covering plate
  13 separating plate
  14 limiting member
  15 connection joint
   151 flange
      151a notch
   152 first extending portion
   153 second extending portion
  16 fastener
2 connecting assembly
  21 first connecting pipe
  22 nozzle
  23 spring
  24 second connecting pipe
3 suction joint
4 base plate
  41 positioning hole
  42 groove
5 press plate
6 positioning block
  61 main portion
  62 protruding portion
7 support plate
8 battery
S receiving cavity
  S1 sub-cavity
  S2 collecting cavity
H1 first through-hole
H2 second through-hole
H3 third through-hole
H4 fourth through-hole
H5 fifth through-hole
H6 sixth through-hole
X length direction
Y width direction
Z height direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third" and the like are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

A device for battery formation of the present disclosure can be used for a formation process of battery 8; specifically, the device for battery formation can be used for degassing the battery 8 in the process of formation. The battery 8 may be a lithium-ion battery. The battery 8 may comprise a case, an electrode assembly and an electrolyte, the electrode assembly and the electrolyte are received in the case.

Figure 2:
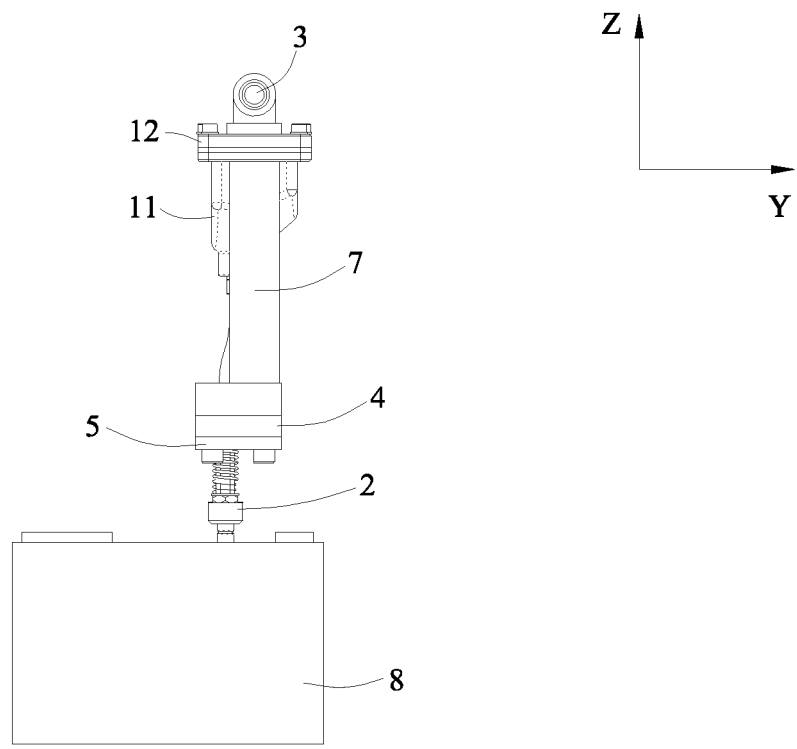
FIG. 2 is another schematic view of the device for battery formation according to the present disclosure.

Specifically, referring to FIG. 1 and FIG. 2, the device for battery formation of the present disclosure comprises a negative pressure mechanism 1, a connecting assembly 2 and a suction joint 3.

Figure 4:
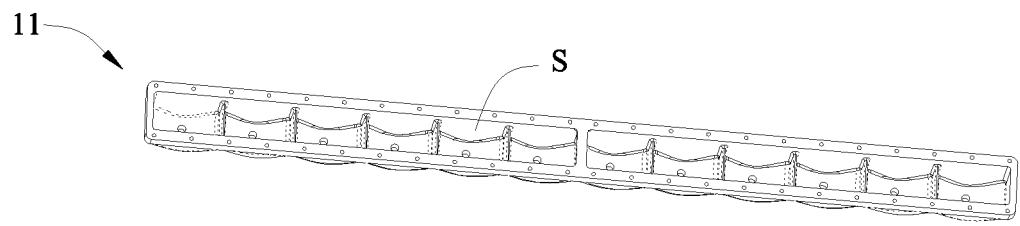
FIG. 4 is a schematic view of a negative pressure container of the negative pressure mechanism of the device for battery formation according to the present disclosure.

Referring to FIG. 4, the negative pressure mechanism 1 has a receiving cavity S inside. The suction joint 3 is provided to the negative pressure mechanism 1 and communicated with the receiving cavity S. The suction joint 3 is capable of being connected to a vacuuming device outside, and the suction joint 3 has a passage inside communicated with the receiving cavity S. The vacuuming device may degas the receiving cavity S via the suction joint 3, so as to keep the receiving cavity S in a negative pressure state.

The connecting assembly 2 is provided as plurality in number, and the plurality of the connecting assemblies 2 are provided to the negative pressure mechanism 1, each connecting assembly 2 is communicated with the receiving cavity S. One end of each connecting assembly 2 can be connected with the negative pressure mechanism 1, the other end of the each connecting assembly 2 can be connected with an electrolyte injection hole of the battery 8, and the electrolyte injection hole is used for injecting an electrolyte into the battery 8 in the process of producing the battery 8. The connecting assembly 2 has a passage inside; the passage communicates the receiving cavity S and the inner space of the battery 8.

When the batteries 8 need to be formatted, it can connect each connecting assembly 2 to a battery 8 and connect the suction joint 3 to the vacuuming device. Then it cyclically charges and discharges the batteries 8, and it starts the vacuuming device. Gases are generated in the batteries 8 in the process of charge and discharge, and the vacuuming device can degas the batteries 8 via the suction joint 3, the receiving cavity S and the connecting assemblies 2, thereby avoiding the gases being remained in the electrode assemblies.

However, in the degassing process, the electrolytes in the batteries may be brought out by the gases. In the present disclosure, the receiving cavity S is provided between the vacuuming device and batteries 8, and the electrolytes brought out by the gases can be stored in the receiving cavity S. When the formation process is finished and the vacuuming device breaks the vacuum state, the electrolytes in the receiving cavity S flow back to the batteries 8 via the connecting assemblies 2.

In the known technology, it generally provides one independent container similar to the negative pressure mechanism of the present disclosure to each battery, the receiving cavity of each container receives the electrolyte of one corresponding battery. However, a gap exists between adjacent containers, and the gap leads to the containers occupying a large space; at the same time, the capacity of the receiving cavity of each container becomes smaller, so the compatibility is poor. When model of the batteries changes, it needs to assemble or disassemble a plurality of containers at the same time, which leads to the model changing process complex and seriously influences the efficiency of the battery formation process.

In the present disclosure, it integrates a plurality of connecting assemblies 2 to one negative pressure mechanism 1, and stores the electrolytes of the batteries 8 by using the receiving cavity S of the negative pressure mechanism 1. Therefore, compared to the known technology, the negative pressure mechanism 1 of the present disclosure occupies a smaller space, and the receiving cavity S inside the negative pressure mechanism 1 has a larger capacity, thereby improving the compatibility of the device for battery formation of the present disclosure. In addition, when the model of the batteries 8 changes, it only needs to adjust the connecting assemblies 2, and there is no need to assemble or disassemble the negative pressure mechanism 1, thereby simplifying the model changing process, improving the efficiency of the battery formation.

Figure 3:
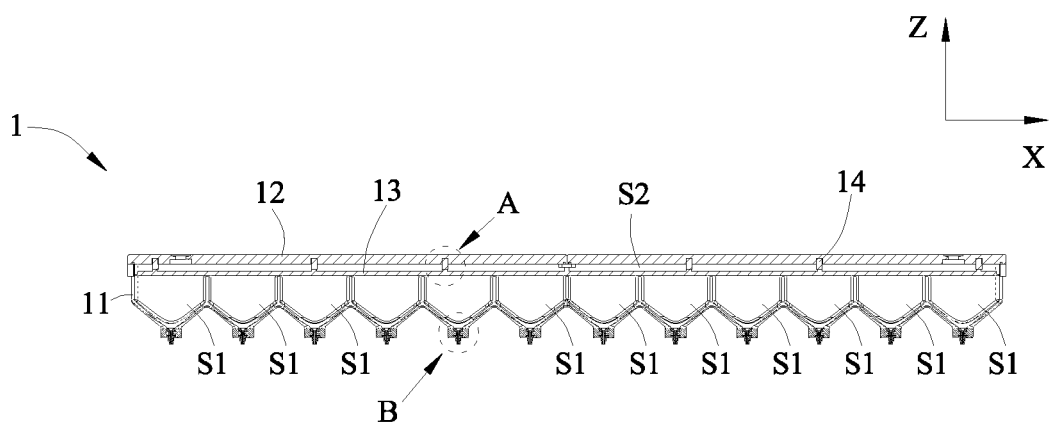
FIG. 3 is schematic view of a negative pressure mechanism of the device for battery formation according to the present disclosure.

Referring to FIG. 3, the negative pressure mechanism 1 comprises a negative pressure container 11 and a covering plate 12, the receiving cavity S is formed in the negative pressure container 11, the covering plate 12 is connected with the negative pressure container 11 and seals the receiving cavity S. The covering plate 12 can be connected with the negative pressure container 11 by a bolt; a gasket may be provided between the covering plate 12 and the negative pressure container 11, so as to promote the sealing performance and improve the degassing efficiency of the vacuuming device. The negative pressure container 11 can be injection molded by polyvinylidene fluoride.

The covering plate 12 and the negative pressure container 11 may be arranged up and down in a height direction Z. The suction joint 3 is connected with the covering plate 12; the connecting assembly 2 is connected with the negative pressure container 11. Preferably, the suction joint 3 is positioned above the covering plate 12 in the height direction Z, the connecting assembly 2 is positioned below the negative pressure container 11 in the height direction Z.

The receiving cavity S comprises a sub-cavity S1 and a collecting cavity S2, the sub-cavity S1 is provided as plurality in number, and the plurality of the sub-cavities S1 are separated from each other, the collecting cavity S2 is positioned at a side of the plurality of sub-cavities S1 close to the covering plate 12, and the collecting cavity S2 is communicated with the plurality of sub-cavities S1.

Referring to FIG. 3 and FIG. 4, the negative pressure container 11 is provided with ribbed plates inside, the ribbed plate separates the adjacent sub-cavities S1. The sub-cavity S1 has an opening at an end facing the covering plate 12. The collecting cavity S2 and the openings of the plurality of sub-cavities S1 are communicated.

The suction joint 3 and the collecting cavity S2 are communicated. When the vacuuming device works, the gases in the plurality of sub-cavities S1 are collected to the collecting cavity S2 under the action of negative pressure, then the gases enter into the vacuuming device via the suction joint 3. In other words, by providing the collecting cavity S2, one suction joint 3 can degas the plurality of sub-cavities S1.

Each connecting assembly 2 is communicated with one corresponding sub-cavity S1. Each connecting assembly 2 can communicate one battery 8 and one sub-cavity S1. In the degassing process, the electrolyte in each battery 8 brought out by gases is stored in one corresponding sub-cavity S1. The sub-cavities S1 of the negative pressure container 11 are separated from each other, so the electrolytes in the sub-cavities S1 are difficult to be mixed. When the formation process is finished, the electrolyte in each sub-cavity S1 flows back to the original battery 8, thereby improve the electrolyte capacity consistency of the batteries 8.

The number of the sub-cavities S1 is equal to or more than the number of the connecting assemblies 2. When the number of the batteries 8 changes, it only needs to increase or decrease the corresponding connecting assemblies 2. Therefore, the device for battery formation of the present disclosure has a better versatility.

Each sub-cavity S1 has an oval region at a lower end away from the covering plate 12. A cross-sectional area of the oval region is decreased gradually, this can increase the speed of the electrolyte flowing back to the battery 8, decrease remain and crystallization of the electrolyte, reduce the risk that the passage of the connecting assembly 2 is blocked in the process of long-term use.

Each sub-cavity S1 has the opening communicated with the collecting cavity S2, so in the degassing process, the electrolyte in one sub-cavity S1 may be sputtered to other sub-cavity S1 under the action of the gases, thereby influencing the electrolyte capacity consistency of the batteries 8. Therefore, preferably, the negative pressure mechanism 1 further comprises a separating plate 13, the separating plate 13 is received in the collecting cavity S2, and the separating plate 13 only covers a part of the opening of each sub-cavity S1.

The separating plate 13 may abut on the ribbed plates inside the negative pressure container 11. In a width direction Y, a dimension of the separating plate 13 is smaller than a dimension of the collecting cavity S2; in other words, a gap is kept between the separating plate 13 and an outer wall encircling the collecting cavity S2.

In the present disclosure, the separating plate 13 can cover a part of the opening of each sub-cavity S1, so the separating plate 13 can reduce the risk that the electrolyte sputters to other sub-cavity S1, improve electrolyte capacity consistency of the batteries 8. In addition, the separating plate 13 only covers a part of the opening of the sub-cavity S1, so in the degassing process, the gases in the sub-cavities S1 still can flow into the collecting cavity S2.

Figure 5:
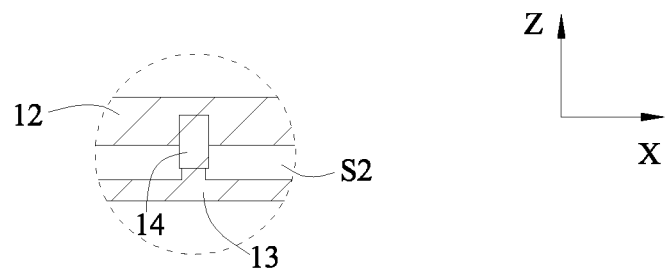
FIG. 5 is an enlarged view of a part of FIG. 3 within a round frame A.

Referring to FIG. 5, the negative pressure mechanism 1 further comprises a limiting member 14, the limiting member 14 is connected with the separating plate 13 and provided between the separating plate 13 and the covering plate 12. An upper end of the limiting member 14 abuts on the covering plate 12, and a lower end of the limiting member 14 abuts on the separating plate 13. In the degassing process, the limiting member 14 can avoid the separating plate 13 vibrating up and down in the height direction Z under the action of negative pressure, and prevent the separating plate 13 blocking a suction opening of the suction joint 3. The limiting member 14 may be in the shape of prism or others, an area of the limiting member 14 is smaller than an area of the separating plate 13; the position of the limiting member 14 should avoid the position of the suction joint 3.

The limiting member 14 can be fixed with the separating plate 13 by threaded connection, bonding and the like; certainly, the limiting member 14 and the separating plate 13 also can be formed integrally.

Figure 6:
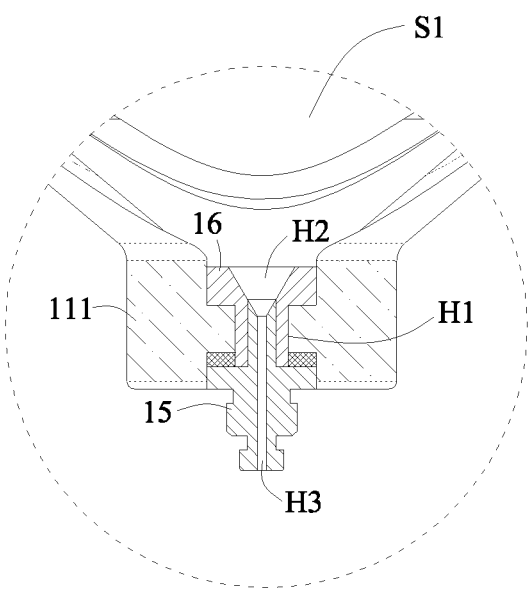
FIG. 6 is an enlarged view of a part of FIG. 3 within a round frame B.
Figure 7:
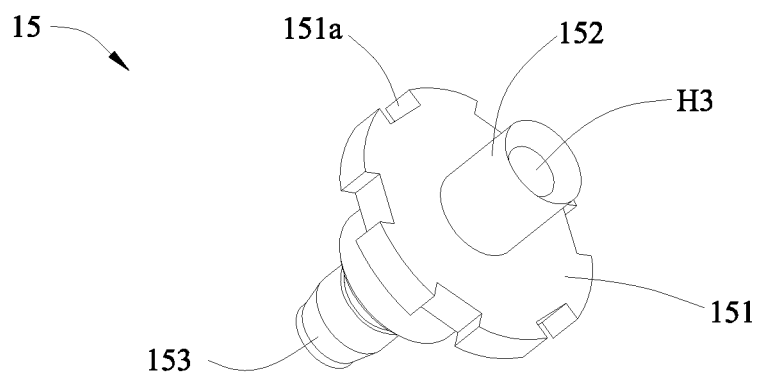
FIG. 7 is a schematic view of a connection joint of the device for battery formation according to the present disclosure.
Figure 8:
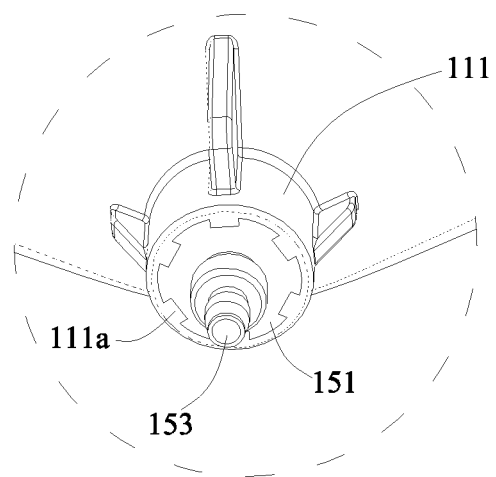
FIG. 8 is a schematic view of the connection joint and the negative pressure container, which are connected together, of the device for battery formation according to the present disclosure.

Referring to FIG. 6 to FIG. 8, the negative pressure container 11 has a plurality of connecting portions 111 protruding at an end away from the covering plate 12, and the number of the connecting portions 111 is equal to the number of the sub-cavities S1. Each connecting portion 111 is in the shape of cylinder.

Each connecting portion 111 is positioned at a side of one corresponding sub-cavity S1 away from the covering plate 12 and has a first through-hole H1 communicated with the sub-cavity S1. The first through-hole H1 has regions with different diameters.

The negative pressure mechanism 1 further comprises a connection joint 15 and a fastener 16, the connection joint 15 has a flange 151, a first extending portion 152 and a second extending portion 153, the first extending portion 152 extends from a side of the flange 151 close to the connecting portion 111, the second extending portion 153 extends from a side of the flange 151 away from the connecting portion 111.

The fastener 16 is received in the first through-hole H1 and has a second through-hole H2, the second through-hole H2 is communicated with the sub-cavity S1. The flange 151 is inserted into the first through-hole H1, the first extending portion 152 is inserted into the second through-hole H2 and connected with the fastener 16 by thread. A gasket may be provided between the flange 151 and the connecting portion 111. The connection joint 15 has a third through-hole H3 passing through the first extending portion 152, the flange 151 and the second extending portion 153, the third through-hole H3 is communicated with the second through-hole H2.

By providing the connection joint 15, the present disclosure can simplify the connecting process of the connecting assembly 2 and the negative pressure mechanism 1. When it needs to install the connecting assembly 2, it directly fixes the connecting assembly 2 to the second extending portion 153 of the connection joint 15.

The flange 151 is provided with a notch 151a along a periphery, the connecting portion 111 has a protrusion 111a extending from a wall of the first through-hole H1, the protrusion 111a is inserted into the notch 151a. By providing the fit between the protrusion 111a and the notch 151a, the present disclosure can prevent the connection joint 15 rotating in the process of formation.

Each connecting assembly 2 comprises a first connecting pipe 21 and a nozzle 22, one end of the first connecting pipe 21 is connected with the negative pressure mechanism 1, the other end of the first connecting pipe 21 is connected with the nozzle 22. The first connecting pipe 21 can be directly connected with the second extending portion 153 of the connection joint 15, and also can be indirectly connected with the second extending portion 153 of the connection joint 15 via other member. The nozzle 22 is in form of two layers and provided with two layers of gaskets inside and has a better sealing performance. In the formation process, the nozzle 22 can cover the electrolyte injection hole of the battery 8 from outside or be inserted into the electrolyte injection hole.

Figure 9:
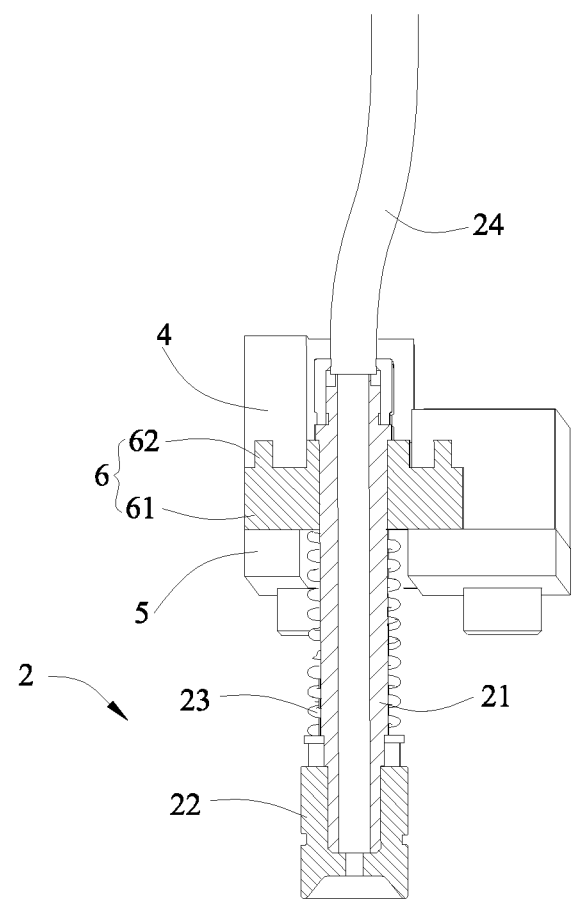
FIG. 9 is a schematic view of a connecting assembly of the device for battery formation according to the present disclosure.

Referring to FIG. 1 and FIG. 9, the device for battery formation further comprises a base plate 4, a press plate 5, a positioning block 6 and a support plate 7. The positioning block 6 is provided as plurality in number and the plurality of positioning blocks 6 are positioned between the base plate 4 and the press plate 5. The base plate 4 may be fixed to an external frame by bolts. The negative pressure mechanism 1 may be connected to the base plate 4 via the support plate 7. The press plate 5 is positioned at a side of the base plate 4 away from negative pressure mechanism 1 and connected with the base plate 4, and the press plate 5 is used for pressing the positioning block 6 on the base plate 4. The first connecting pipe 21 of each connecting assembly 2 is connected with the positioning block 6.

When the batteries 8 need to be formatted, the batteries 8 are positioned to a jig below the press plate 5 in the height direction Z; then an external power device, such as motor, cylinder and the like, moves the batteries 8 upwardly via the jig; correspondingly, when the electrolyte injection hole of battery 8 contacts the nozzle 22 and is covered by the nozzle 22, the power device stops working, and then the formation process of the batteries starts. When the formation process is finished and the electrolytes in the sub-cavities S1 flow back to the batteries 8, the power device moves the batteries 8 downwardly, so as to separate the nozzle 22 and the battery 8.

Figure 10:
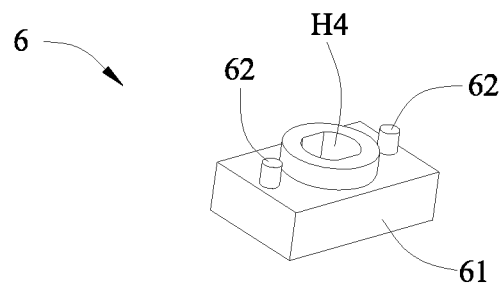
FIG. 10 is a schematic view of a positioning block of the device for battery formation according to the present disclosure.
Figure 11:
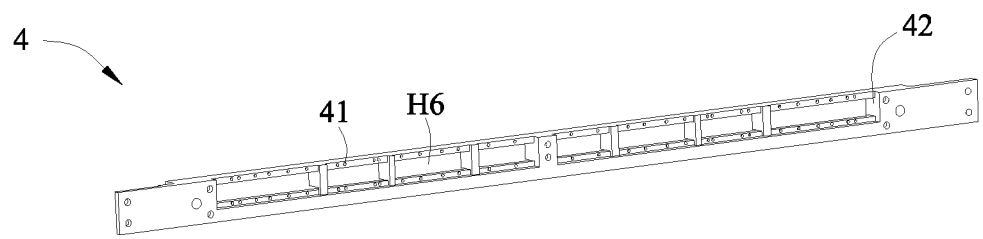
FIG. 11 is a schematic view of a base plate of the device for battery formation according to the present disclosure.
Figure 12:
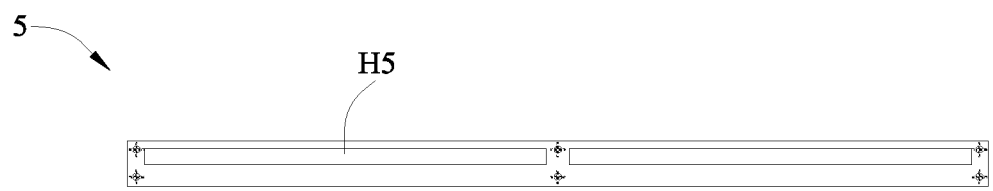
FIG. 12 is a schematic view of a press plate of the device for battery formation according to the present disclosure.

Referring to FIG. 9 and FIG. 10, the positioning block 6 has a main portion 61 and a protruding portion 62, the main portion 61 is provided between the base plate 4 and the press plate 5, the protruding portion 62 extends from a surface of the main portion 61 away from the press plate 5. Referring to FIG. 11, the base plate 4 is provided with a plurality of positioning holes 41, and the protruding portion 62 of each positioning block 6 is inserted into the positioning hole 41.

The press plate 5 and the base plate 4 may be connected by bolts. By rotating the bolts, it can adjust a distance between the press plate 5 and the base plate 4 in the height direction Z. When it needs to install the positioning blocks 6, the bolts are loosened to increase the distance between the press plate 5 and the base plate 4, then the positioning blocks 6 are positioned on the press plate 5, and the protruding portion 62 of the positioning block 6 is made to correspond to the positioning hole 41 of the base plate 4. Finally, the distance between the press plate 5 and the base plate 4 is decreased by tightening the bolts, so that the protruding portion 62 is inserted into the positioning hole 41 and the main portion 61 is clamped between the press plate 5 and the base plate 4.

In the present disclosure, the positioning blocks 6 are fixed by the fit between the base plate 4 and the press plate 5, so when assembling or disassembling the positioning blocks 6, it only needs to rotating the bolts between the press plate 5 and the base plate 4, and there is no need to provide fasteners to each positioning block 6. Therefore, the assembling and the disassembling of the positioning blocks 6 of the present disclosure are convenient, thereby effectively simplifying the production process and improving efficiency.

The main portion 61 is provided with a fourth through-hole H4, the first connecting pipe 21 passes through the fourth through-hole H4 and is connected with the main portion 61. The positioning block 6 is used for fixing the first connecting pipe 21.

The protruding portion 62 of each positioning block 6 is provided as plurality in number, the plurality of protruding portions 62 can avoid the rotation of the main portion 61. Preferably, the protruding portion 62 of each positioning block 6 is provided as two in number.

Preferably, the number of the positioning holes 41 is greater than the total number of the protruding portions 62 of the positioning blocks 6. Referring to FIG. 11, the base plate 4 may be provided with two rows of positioning holes 41, two protruding portions 62 of the positioning block 6 are respectively inserted into two rows of positioning holes 41.

In the production process of battery, it generally needs to format the batteries 8 in different models. When model of the batteries 8 changes, the positions of the electrolyte injection holes will change correspondingly. Therefore, in order to adapt the change of the batteries 8, the positions of the positioning blocks 6 need to change correspondingly too. The base plate 4 in the present disclosure is provided with a plurality of positioning holes 41, the positioning holes 41 correspond to the batteries 8 in different models. When the model of the batteries 8 changes, it only needs to move the positioning blocks 6 to the positioning holes 41 corresponding to the batteries 8 in the new model. Therefore, the device for battery formation of the present disclosure has a better versatility.

Referring to FIG. 9, the nozzle 22 sheathes one end of the first connecting pipe 21, the first connecting pipe 21 may be inserted into a through-hole with step in the nozzle 22 and fixed with the nozzle 22 by interference fit. An outer diameter of the other end of the first connecting pipe 21 away from the nozzle 22 is larger than a diameter of the fourth through-hole H4, so the other end of the first connecting pipe 21 may abut on the main portion 61. The first connecting pipe 21 is capable of sliding along the fourth through-hole H4.

The connecting assembly 2 further comprises a spring 23, the spring 23 sheathes the first connecting pipe 21 and is positioned between the nozzle 22 and the main portion 61.

When the battery 8 needs to be formatted, it moves the battery 8 upwardly; when the nozzle 22 contacts the battery 8, the battery 8 keeps moving upwardly at a certain distance and in turn moves the nozzle 22 upwardly. When the positioning block 6 abuts the spring 23 from above and provides a support force to the spring 23, the spring 23 is compressed by the force; at the same time, an elastic force of the spring 23 presses the nozzle 22 on the battery 8 tightly, so as to ensure the sealing performance between the nozzle 22 and the battery 8. Meanwhile, the spring 23 may be in the function of buffer, and avoid the nozzle 22 damaging the battery 8.

The first connecting pipe 21 is a metal pipe, such as a stainless steel pipe. The metal pipe has a high strength, thereby avoiding the first connecting pipe 21 being bent in the process of moving up and down, and ensuring that the nozzle 22 faces the electrolyte injection hole of the battery 8 up and down.

In the present disclosure, the position of the connection joint 15 is fixed; when model of the battery 8 changes, the position of the positioning block 6 needs to change correspondingly too. The first connecting pipe 21 is a metal pipe, if the first connecting pipe 21 is directly connected with the connection joint 15, in the movement of the positioning block 6, the first connecting pipe 21 can not bend, and is difficult to adapt model change of the battery 8.

Therefore, preferably, the connecting assembly 2 further comprises a second connecting pipe 24, the second connecting pipe 24 connects the first connecting pipe 21 and the negative pressure mechanism 1, and the second connecting pipe 24 is a flexible pipe. Two ends of the second connecting pipe 24 are respectively connected with the second extending portion 153 of the connection joint 15 and the first connecting pipe 21 via joint nuts. The flexible pipe has a larger length and is easy to bend, so when model of the battery 8 changes, the positioning block 6 and the first connecting pipe 21 can move freely. The material of the second connecting pipe 24 may be PTFE.

The nozzle 22 is positioned at a side of the press plate 5 away from the base plate 4. The press plate 5 is provided with a fifth through-hole H5 in the shape of strip, the base plate 4 is provided with a sixth through-hole H6 in the shape of strip, the fifth through-hole H5 and the sixth through-hole H6 are respectively positioned at two sides of the fourth through-hole H4. The base plate 4, the press plate 5 and the nozzle 22 are arranged in the height direction Z, and the fifth through-hole H5 and the sixth through-hole H6 are respectively positioned at two sides of the fourth through-hole H4 in the height direction Z.

The first connecting pipes 21 of the connecting assemblies 2 are capable of passing through the fifth through-hole H5.

By providing the fifth through-hole H5, it can avoid the interference between the press plate 5 and the first connecting pipe 21. Because the fifth through-hole H5 has a large length, so when the position of the positioning block 6 changes, the first connecting pipe 21 can slide freely in the fifth through-hole H5.

The sixth through-hole H6 exposes one end of the first connecting pipe 21 away from the nozzle 22. By providing the sixth through-hole H6, it can connect the second connecting pipe 24 and the first connecting pipe 21 conveniently. The sixth through-hole H6 has a larger length, so when the position of the positioning block 6 changes, the end of the first connecting pipe 21 away from the nozzle 22 can slide freely in the sixth through-hole H6.

Referring to FIG. 11, the base plate 4 has a groove 42, the groove 42 is recessed relative to a surface of the base plate 4 close to the press plate 5. At least a part of the main portion 61 of the positioning block 6 is received in the groove 42. The sixth through-hole H6 and the positioning hole 41 are formed to a bottom wall of the groove 42 away from the press plate 5. By providing the groove 42, it can save space in the height direction Z; at the same time, the press plate 5 may be attached on the surface of the base plate 4, so as to position and install the press plate 5 conveniently.

What is claimed is:

1. A device for battery formation, comprising a negative pressure mechanism, a connecting assembly and a suction joint;
   the negative pressure mechanism having a receiving cavity inside;
   the suction joint being provided to the negative pressure mechanism and communicated with the receiving cavity;
   the connecting assembly being provided as plurality in number, and the plurality of the connecting assemblies being provided to the negative pressure mechanism; each connecting assembly being communicated with the receiving cavity,
   wherein
   each connecting assembly comprises a first connecting pipe and a nozzle, one end of the first connecting pipe is connected with the negative pressure mechanism, the other end of the first connecting pipe is connected with the nozzle;
   the device for battery formation further comprises a base plate, a press plate and a positioning block;
   the positioning block is provided as plurality in number and the plurality of positioning blocks are positioned between the base plate and the press plate;
   the negative pressure mechanism is connected with the base plate, the press plate is positioned at a side of the base plate away from negative pressure mechanism and connected with the base plate; and
   the first connecting pipe of each connecting assembly is connected with the positioning block.

2. The device for battery formation according to claim 1, wherein
   the positioning block has a main portion and a protruding portion, the main portion is provided between the base plate and the press plate, the protruding portion extends from a surface of the main portion away from the press plate;
   the base plate is provided with a plurality of positioning holes, and the protruding portion of each positioning block is inserted into the positioning hole;
   the main portion is provided with a fourth through-hole, the first connecting pipe passes through the fourth through-hole and is connected with the main portion.

3. The device for battery formation according to claim 2, wherein
   the nozzle sheathes one end of the first connecting pipe, an outer diameter of the other end of the first connecting pipe away from the nozzle is larger than a diameter of the fourth through-hole;
   the connecting assembly further comprises a spring, the spring sheathes the first connecting pipe and is positioned between the nozzle and the main portion.

4. The device for battery formation according to claim 3, wherein
   the first connecting pipe is a metal pipe;
   the connecting assembly further comprises a second connecting pipe, the second connecting pipe connects the first connecting pipe and the negative pressure mechanism, and the second connecting pipe is a flexible pipe.

5. The device for battery formation according to claim 2, wherein
   the nozzle is positioned at a side of the press plate away from the base plate;
   the press plate is provided with a fifth through-hole in the shape of strip, the base plate is provided with a sixth through-hole in the shape of strip, the fifth through-hole and the sixth through-hole are respectively positioned at two sides of the fourth through-hole;
   the first connecting pipes of the plurality of connecting assemblies pass through the fifth through-hole; the sixth through-hole exposes one end of the first connecting pipe away from the nozzle.

6. The device for battery formation according to claim 1, wherein the negative pressure mechanism comprises a negative pressure container and a covering plate, the receiving cavity is formed in the negative pressure container, the covering plate is connected to the negative pressure container and seals the receiving cavity;
   the suction joint is connected to the covering plate; and
   the connecting assembly is connected to the negative pressure container.

7. The device for battery formation according to claim 6, wherein
   the receiving cavity comprises a sub-cavity and a collecting cavity, the sub-cavity is provided as plurality in number, and the plurality of the sub-cavities are separated from each other; the collecting cavity is positioned at a side of the plurality of sub-cavities close to the covering plate, and the collecting cavity is communicated with the plurality of sub-cavities;
   the suction joint and the collecting cavity are communicated;
   each connecting assembly is communicated with one corresponding sub-cavity.

8. The device for battery formation according to claim 7, wherein
   the negative pressure mechanism further comprises a separating plate, the separating plate is received in the collecting cavity;
   each sub-cavity has an opening communicated with the collecting cavity, and the separating plate only covers a part of the opening of each sub-cavity.

9. The device for battery formation according to claim 8, wherein
   the negative pressure mechanism further comprises a limiting member, the limiting member is connected with the separating plate and provided between the separating plate and the covering plate.

10. The device for battery formation according to claim 7, wherein the negative pressure container has a plurality of connecting portions protruding at an end away from the covering plate, and the number of the connecting portions is equal to the number of the sub-cavities;

each connecting portion is positioned at a side of one corresponding sub-cavity away from the covering plate and has a first through-hole communicated with the sub-cavity;

the negative pressure mechanism further comprises a connection joint and a fastener, the connection joint has a flange, a first extending portion and a second extending portion, the first extending portion extends from a side of the flange close to the connecting portion, the second extending portion extends from a side of the flange away from the connecting portion;

the fastener is received in the first through-hole and has a second through-hole, the second through-hole is communicated with the sub-cavity;

the flange is inserted into the first through-hole, the first extending portion is inserted into the second through-hole and connected with the fastener by thread;

the connection joint has a third through-hole passing through the first extending portion, the flange and the second extending portion, the third through-hole is communicated with the second through-hole.

11. The device for battery formation according to claim 10, wherein the flange is provided with a notch along a periphery, the connecting portion has a protrusion extending from a wall of the first through-hole, the protrusion is inserted into the notch.

* * * * *